United States Patent
Defilippo et al.

(10) Patent No.: US 11,706,210 B2
(45) Date of Patent: Jul. 18, 2023

(54) COMPUTING CONNECTION CREDENTIAL VERIFICATION

(71) Applicant: CITRIX SYSTEMS, INC., Fort Lauderdale, FL (US)

(72) Inventors: Richard Defilippo, Coral Springs, FL (US); Himanshu Parihar, Pompano Beach, FL (US); Krishit Vimal Shah, Pompano Beach, FL (US); Ullas Shamasundar, Pompano Beach, FL (US)

(*) Notice: Subject to any disclaimer, the term of this patent is extended or adjusted under 35 U.S.C. 154(b) by 0 days.

(21) Appl. No.: 17/443,201

(22) Filed: Jul. 22, 2021

(65) Prior Publication Data
US 2023/0023991 A1   Jan. 26, 2023

(51) Int. Cl.
*H04L 29/06*   (2006.01)
*H04L 9/40*   (2022.01)
*H04L 9/08*   (2006.01)

(52) U.S. Cl.
CPC .......... *H04L 63/083* (2013.01); *H04L 9/0825* (2013.01); *H04L 63/166* (2013.01)

(58) Field of Classification Search
CPC ... H04L 63/083; H04L 9/0825; H04L 63/166; H04L 9/3268; H04L 63/168; H04L 63/0823; H04L 63/1466
See application file for complete search history.

(56) References Cited

U.S. PATENT DOCUMENTS

| | | | | |
|---|---|---|---|---|
| 8,590,030 | B1* | 11/2013 | Pei | H04L 63/0838 726/9 |
| 9,165,126 | B1* | 10/2015 | Johansson | H04L 63/1466 |
| 9,438,597 | B1* | 9/2016 | Taylor | H04L 63/0853 |
| 9,516,018 | B1* | 12/2016 | Vazquez | G06F 21/34 |
| 9,621,540 | B2* | 4/2017 | Almahallawy | H04L 63/062 |
| 10,149,159 | B1* | 12/2018 | Perfitt | H04L 9/3265 |
| 2006/0294366 | A1* | 12/2006 | Nadalin | H04L 9/3271 713/156 |
| 2007/0198825 | A1* | 8/2007 | Schwarz | H04L 63/166 713/151 |
| 2007/0245148 | A1* | 10/2007 | Buer | H04L 9/3234 713/183 |
| 2009/0013177 | A1* | 1/2009 | Lee' | H04L 63/10 713/158 |
| 2009/0210712 | A1* | 8/2009 | Fort | H04L 63/1441 713/175 |

(Continued)

OTHER PUBLICATIONS

Anonymous "What is certificate pinning?" https://owasp.org/www-community/controls/Certificate and_Public_Key_Pinning; pp. 8.

(Continued)

*Primary Examiner* — Khalid M Almaghayreh

(57) ABSTRACT

A computing device may include a memory and a processor configured to cooperate with the memory to establish a connection with a client device, with the client device having a first credential to connect the client device to a computing service, and the first credential being provided by a proxy. The processor may further receive a request from the client device via the connection to validate the first credential before use of the first credential by the client device, and validate the first credential with use of a second credential for the computing service obtained independent of the proxy.

21 Claims, 8 Drawing Sheets

(56) References Cited

U.S. PATENT DOCUMENTS

| | | | | |
|---|---|---|---|---|
| 2012/0102039 | A1* | 4/2012 | Gifford | G06F 16/25 |
| | | | | 707/741 |
| 2012/0204032 | A1* | 8/2012 | Wilkins | H04L 63/0428 |
| | | | | 713/170 |
| 2013/0305041 | A1* | 11/2013 | Bar-El | H04L 63/083 |
| | | | | 713/156 |
| 2014/0181933 | A1* | 6/2014 | Sanjeev | H04L 63/126 |
| | | | | 726/7 |
| 2016/0180076 | A1* | 6/2016 | Katieb | G06F 21/42 |
| | | | | 726/6 |
| 2016/0182488 | A1* | 6/2016 | Mowers | H04L 63/166 |
| | | | | 726/4 |
| 2016/0261630 | A1* | 9/2016 | Benson | H04L 63/1483 |
| 2016/0315910 | A1* | 10/2016 | Kaufman | H04L 61/4511 |
| 2017/0279795 | A1* | 9/2017 | Redberg | H04L 63/0861 |
| 2018/0007021 | A1* | 1/2018 | Deriso | H04L 63/0442 |
| 2018/0089403 | A1* | 3/2018 | Watson | G06F 21/45 |
| 2018/0288032 | A1* | 10/2018 | Boxiner | H04L 63/0823 |
| 2018/0367530 | A1* | 12/2018 | Mistry | H04L 63/0823 |
| 2021/0204032 | A1* | 7/2021 | VanSickel | H04N 21/8352 |
| 2021/0392002 | A1* | 12/2021 | Gray | H04L 9/3247 |
| 2022/0141326 | A1* | 5/2022 | Joshi | H04M 1/66 |
| | | | | 455/411 |
| 2022/0182413 | A1* | 6/2022 | Benson | H04L 9/085 |

OTHER PUBLICATIONS

Walton et al. "Certificat and Public Key Pinning" https://labs.nettitude.com/tutorials/tls-certificate-pinning-101 pp. 9.

U.S. Appl. No. 17/230,442, filed Apr. 14, 2021 Athlur et al.

* cited by examiner

COMPUTING CONNECTION CREDENTIAL VERIFICATION

BACKGROUND

Many organizations are now using applications to provide a more flexible option to address the varying needs of their users. In desktop virtualization, a user's operating system, applications, and/or user settings may be separated from the user's physical smartphone, laptop, or desktop computer. Using client-server technology, a "virtualized desktop" may be stored in and administered by a remote server, rather than in the local storage of a client computing device.

There are several different types of desktop virtualization systems. Virtual Desktop Infrastructure (VDI) refers to the process of running a user desktop inside a virtual machine that resides on a server. Virtualization systems may also be implemented in a cloud computing environment in which a pool of computing desktop virtualization servers, storage disks, networking hardware, and other physical resources may be used to provision virtual desktops, and/or provide access to shared applications. Whether using a virtualization system or otherwise, such computing resources and services are typically accessed through private networks (e.g., private home or office networks), or public networks (e.g., wireless local area network (LAN) hotspots).

SUMMARY

A computing device may include a memory and a processor configured to cooperate with the memory to establish a connection with a client device, with the client device having a first credential to connect the client device to a computing service, and the first credential being provided by a proxy. The processor may further receive a request from the client device via the connection to validate the first credential before use of the first credential by the client device, and validate the first credential with use of a second credential for the computing service obtained independent of the proxy.

By way of example, the second credential may comprise one or more of a Secure Sockets Layer (SSL) certificate, Domain Name System (DNS) credential, Public Key Infrastructure (PKI) certificate, Internet Protocol (IP) address, and a trusted root certificate for the computing service. In accordance with an example embodiment, the processor may establish the connection with the client device using public key pinning.

A related method may include establishing a connection between a computing device and a client device, with the client device having a first credential to connect the client device to a computing service and the first credential being provided by a proxy. The method may further include receiving a request at the computing device from the client device via the connection to validate the first credential before use of the first credential by the client device, and validating at the computing device the first credential with use of a second credential for the computing service obtained independent of the proxy.

Another related computing device may include a memory and a processor configured to cooperate with the memory to receive a first credential to connect the computing device to a computing service from a proxy, generate a request for a second credential for the computing service obtained independent of the proxy, and validate the first credential with use of the second credential before use of the first credential. In some embodiments, the processor may be further configured to terminate a connection with the proxy responsive to a failure to validate the first credential.

Still another related method may include receiving a first credential at a computing device to connect the computing device to a computing service from a proxy, and generating at the computing device a request for a second credential for the computing service obtained independent of the proxy. The method may further include validating the first credential with use of the second credential at the computing device before use of the first credential.

DETAILED DESCRIPTION

With respect to Internet and cloud service communications, a large amount of sensitive information gets communicated over public network infrastructure. Clients and servers try to establish secure paths for communication, such as Secure Socket Layers (SSLs) and Virtual Private Networks (VPNs), for example. However, these technologies may still be vulnerable to malicious users or hackers who are constantly on the lookout to try and gather sensitive information (e.g., information about system users) by various techniques. Such techniques may include Man-In-The-Middle (MITM) attacks and connections via interception by proxy servers (hereinafter referred to as proxies or proxy devices). So, with MITM and proxy server connections, the communication between a client and desired computing service can be intercepted without the knowledge and consent of these entities, or the communication can be redirected to malicious servers to gain sensitive information and use it for nefarious purposes. These vulnerabilities become more prominent when a user or client is connecting via a public access point, such as a public wireless LAN hotspot at coffee shops, shopping malls, airports or train stations, for example, because they are not part of a trusted home or workplace computing network and security is therefore unknown.

The embodiments set forth herein provide a verification of validation service, such as through a cloud-based service, that can be contacted by a client device to verify if the connecting server or service is valid and trusted, or if the connection is being intercepted by an unknown server or service that could potentially be trying to obtain sensitive information via messages or other communications transmitted using that channel. The validation service may be set up as a standalone entity, or as a cloud-based service, to enroll devices and/or managed apps and validate third party credentials of the enrolled devices/apps intend to use for connection to various computing services. This approach provides an extra layer of security to clients, allowing them to delegate certificate validation to an already trusted validation service. This extra layer of protection helps avoid MITM and other similar types of attacks, in that the validation service helps ensure that the client is communicating with the endpoint they think they are communicating with, rather than with a malicious server the client was redirected to. Furthermore, this approach allows for enhanced security control by enterprises above and beyond regular DNS validation and normal certificate validation, as the validation service can perform real-time validation of connection credentials before a client uses these credentials, and independent of the proxy or source that provided credentials to the client.

Figure 1:
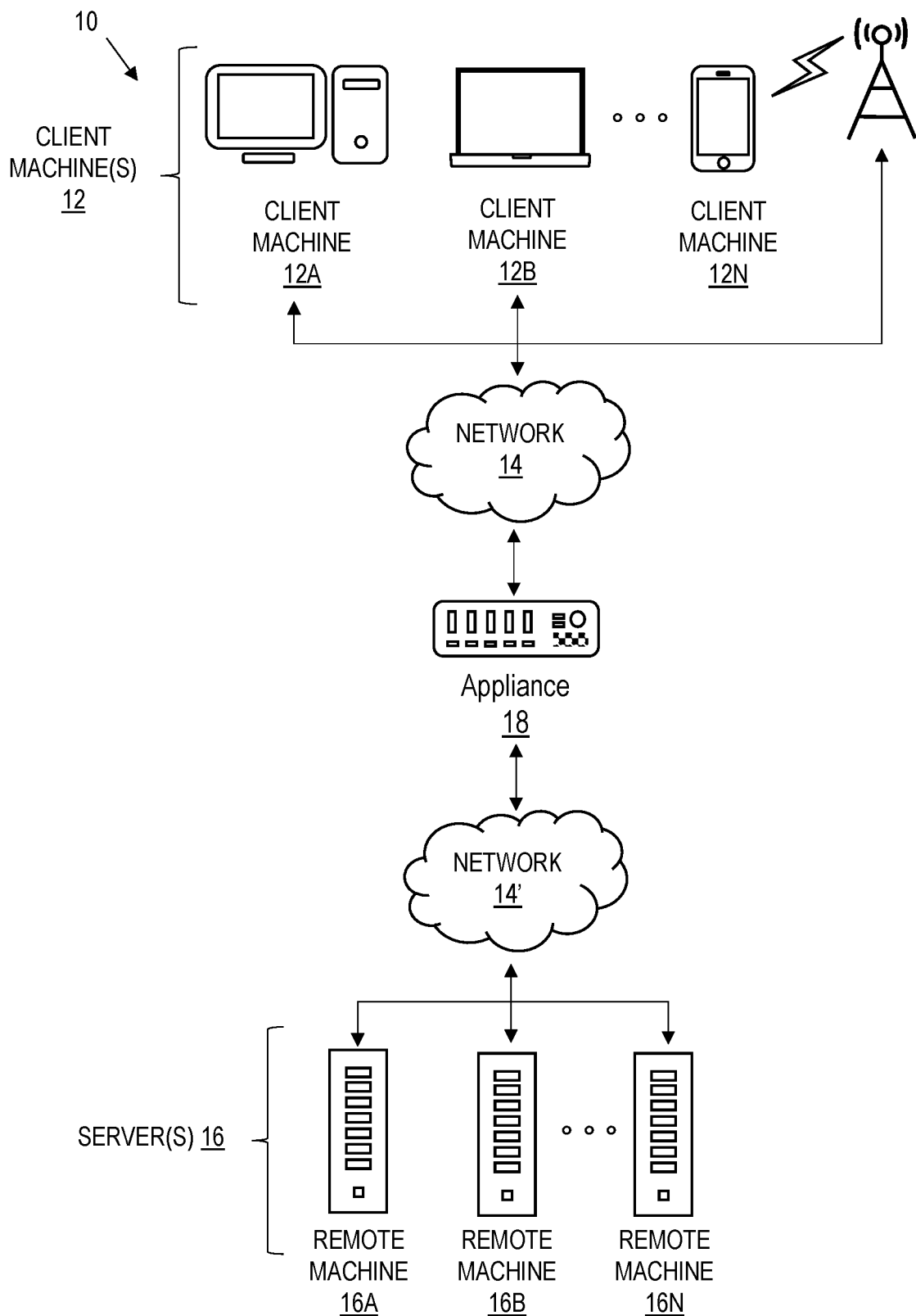
FIG. 1 is a schematic block diagram of a network environment of computing devices in which various aspects of the disclosure may be implemented.

Referring initially to FIG. 1, a non-limiting network environment 10 in which various aspects of the disclosure may be implemented includes one or more client machines 12A-12N, one or more remote machines 16A-16N, one or more networks 14, 14', and one or more appliances 18 installed within the computing environment 10. The client machines 12A-12N communicate with the remote machines 16A-16N via the networks 14, 14'.

In some embodiments, the client machines 12A-12N communicate with the remote machines 16A-16N via an intermediary appliance 18. The illustrated appliance 18 is positioned between the networks 14, 14' and may also be referred to as a network interface or gateway. In some embodiments, the appliance 108 may operate as an application delivery controller (ADC) to provide clients with access to business applications and other data deployed in a data center, the cloud, or delivered as Software as a Service (SaaS) across a range of client devices, and/or provide other functionality such as load balancing, etc. In some embodiments, multiple appliances 18 may be used, and the appliance(s) 18 may be deployed as part of the network 14 and/or 14'.

The client machines 12A-12N may be generally referred to as client machines 12, local machines 12, clients 12, client nodes 12, client computers 12, client devices 12, computing devices 12, endpoints 12, or endpoint nodes 12. The remote machines 16A-16N may be generally referred to as servers 16 or a server farm 16. In some embodiments, a client device 12 may have the capacity to function as both a client node seeking access to resources provided by a server 16 and as a server 16 providing access to hosted resources for other client devices 12A-12N. The networks 14, 14' may be generally referred to as a network 14. The networks 14 may be configured in any combination of wired and wireless networks.

A server 16 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 16 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 16 may execute a remote presentation services program or other program that uses a thin-client or a remote-display protocol to capture display output generated by an application executing on a server 16 and transmit the application display output to a client device 12.

In yet other embodiments, a server 16 may execute a virtual machine providing, to a user of a client device 12, access to a computing environment. The client device 12 may be a virtual machine. The virtual machine may be managed by, for example, a hypervisor, a virtual machine manager (VMM), or any other hardware virtualization technique within the server 16.

In some embodiments, the network 14 may be: a local-area network (LAN); a metropolitan area network (MAN); a wide area network (WAN); a primary public network 14; and a primary private network 14. Additional embodiments may include a network 14 of mobile telephone networks that use various protocols to communicate among mobile devices. For short range communications within a wireless local-area network (WLAN), the protocols may include 802.11, and Near Field Communication (NFC).

Figure 2:
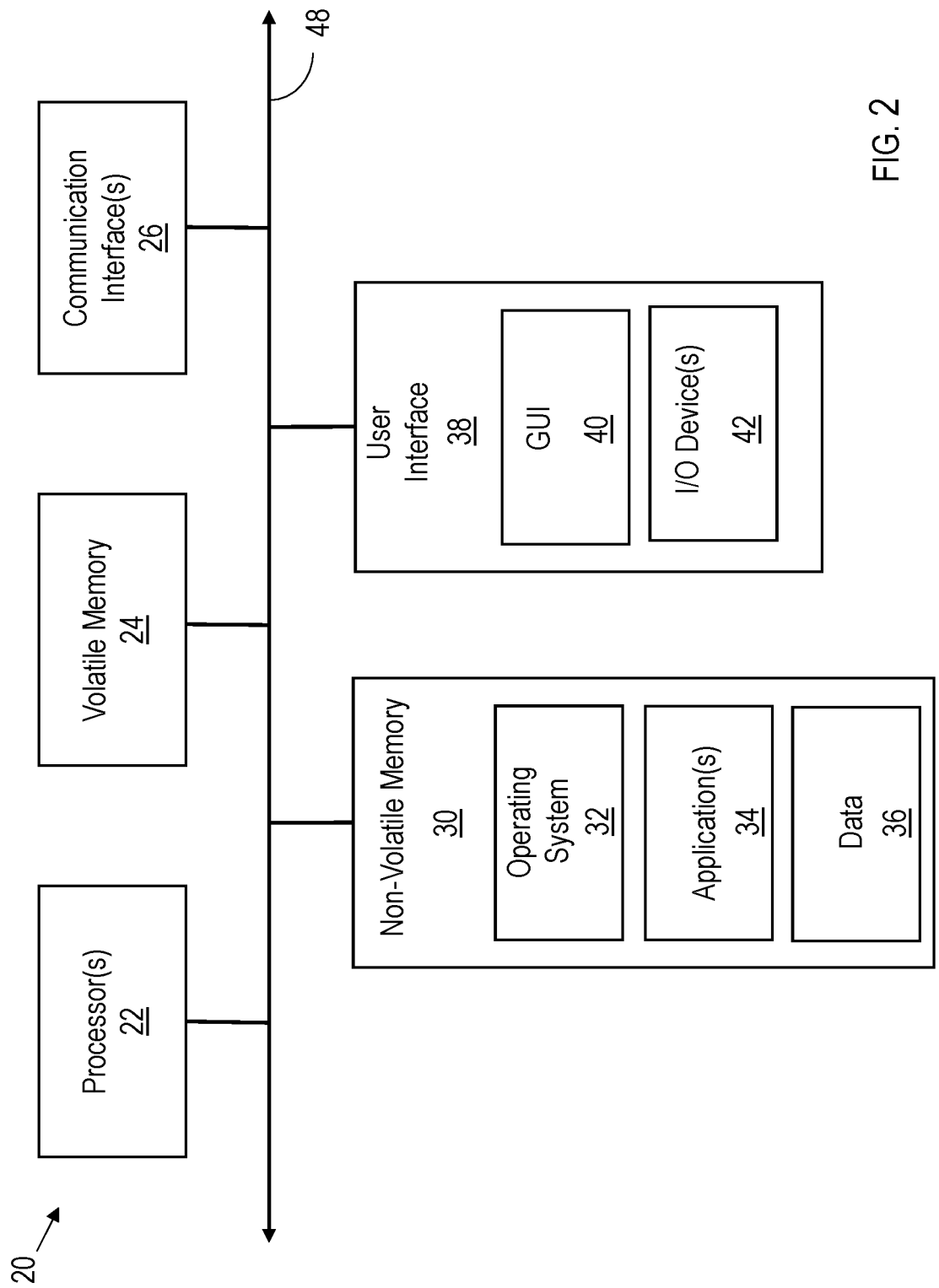
FIG. 2 is a schematic block diagram of a computing device useful for practicing an embodiment of the client machines or the remote machines illustrated in FIG. 1.

FIG. 2 depicts a block diagram of a computing device 20 useful for practicing an embodiment of client devices 12, appliances 18 and/or servers 16. The computing device 20 includes one or more processors 22, volatile memory 24 (e.g., random access memory (RAM)), non-volatile memory 30, user interface (UI) 38, one or more communications interfaces 26, and a communications bus 48.

The non-volatile memory 30 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 38 may include a graphical user interface (GUI) 40 (e.g., a touchscreen, a display, etc.) and one or more input/output (I/O) devices 42 (e.g., a mouse, a keyboard, a microphone, one or more speakers, one or more cameras, one or more biometric scanners, one or more environmental sensors, and one or more accelerometers, etc.).

The non-volatile memory 30 stores an operating system 32, one or more applications 34, and data 36 such that, for example, computer instructions of the operating system 32 and/or the applications 34 are executed by processor(s) 22 out of the volatile memory 24. In some embodiments, the volatile memory 24 may include one or more types of RAM and/or a cache memory that may offer a faster response time than a main memory. Data may be entered using an input device of the GUI 40 or received from the I/O device(s) 42. Various elements of the computer 20 may communicate via the communications bus 48.

The illustrated computing device 20 is shown merely as an example client device or server, and may be implemented by any computing or processing environment with any type of machine or set of machines that may have suitable hardware and/or software capable of operating as described herein.

The processor(s) 22 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 22 may be analog, digital or mixed-signal. In some embodiments, the processor 22 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 26 may include one or more interfaces to enable the computing device 20 to access a computer network such as a Local Area Network (LAN), a Wide Area Network (WAN), a Personal Area Network (PAN), or the Internet through a variety of wired and/or wireless connections, including cellular connections.

In described embodiments, the computing device 20 may execute an application on behalf of a user of a client device. For example, the computing device 20 may execute one or more virtual machines managed by a hypervisor. Each virtual machine may provide an execution session within which applications execute on behalf of a user or a client device, such as a hosted desktop session. The computing device 20 may also execute a terminal services session to provide a hosted desktop environment. The computing device 20 may provide access to a remote computing environment including one or more applications, one or more desktop applications, and one or more desktop sessions in which one or more applications may execute.

An example virtualization server 16 may be implemented using Citrix Hypervisor provided by Citrix Systems, Inc., of Fort Lauderdale, Fla. ("Citrix Systems"). Virtual app and desktop sessions may further be provided by Citrix Virtual Apps and Desktops (CVAD), also from Citrix Systems. Citrix Virtual Apps and Desktops is an application virtualization solution that enhances productivity with universal access to virtual sessions including virtual app, desktop, and data sessions from any device, plus the option to implement a scalable VDI solution. Virtual sessions may further include Software as a Service (SaaS) and Desktop as a Service (DaaS) sessions, for example.

Figure 3:
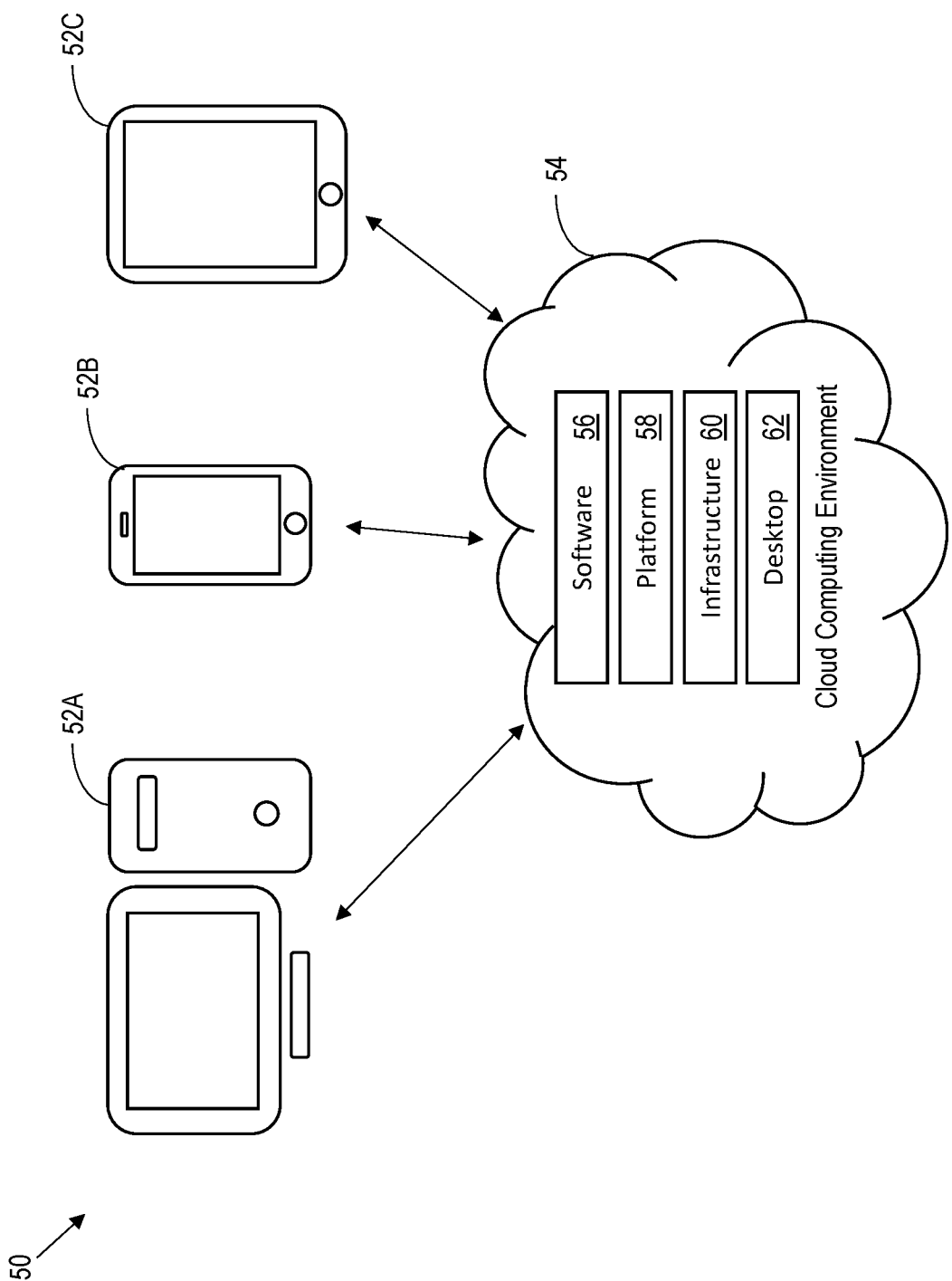
FIG. 3 is a schematic block diagram of a cloud computing environment in which various aspects of the disclosure may be implemented.

Referring to FIG. 3, a cloud computing environment 50 is depicted, which may also be referred to as a cloud environment, cloud computing or cloud network. The cloud computing environment 50 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 50, one or more clients 52A-52C (such as those described above) are in communication with a cloud network 54. The cloud network 54 may include backend platforms, e.g., servers, storage, server farms or data centers. The users or clients 52A-52C can correspond to a single organization/tenant or multiple organizations/tenants. More particularly, in one example implementation the cloud computing environment 50 may provide a private cloud serving a single organization (e.g., enterprise cloud). In another example, the cloud computing environment 50 may provide a community or public cloud serving multiple organizations/tenants. In still further embodiments, the cloud computing environment 50 may provide a hybrid cloud that is a combination of a public cloud and a private cloud. Public clouds may include public servers that are maintained by third parties to the clients 52A-52C or the enterprise/tenant. The servers may be located off-site in remote geographical locations or otherwise.

The cloud computing environment 50 can provide resource pooling to serve multiple users via clients 52A-52C through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 50 can provide on-demand self-service to unilaterally provision computing capabilities (e.g., server time, network storage) across a network for multiple clients 52A-52C. The cloud computing environment 50 can provide an elasticity to dynamically scale out or scale in responsive to different demands from one or more clients 52. In some embodiments, the computing environment 50 can include or provide monitoring services to monitor, control and/or generate reports corresponding to the provided shared services and resources.

In some embodiments, the cloud computing environment 50 may provide cloud-based delivery of different types of cloud computing services, such as Software as a service (SaaS) 56, Platform as a Service (PaaS) 58, Infrastructure as a Service (IaaS) 60, and Desktop as a Service (DaaS) 62, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., GOOGLE APP ENGINE provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., MICROSOFT SKYDRIVE provided by Microsoft Corporation, GOOGLE DRIVE provided by Google Inc., or APPLE ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 4:
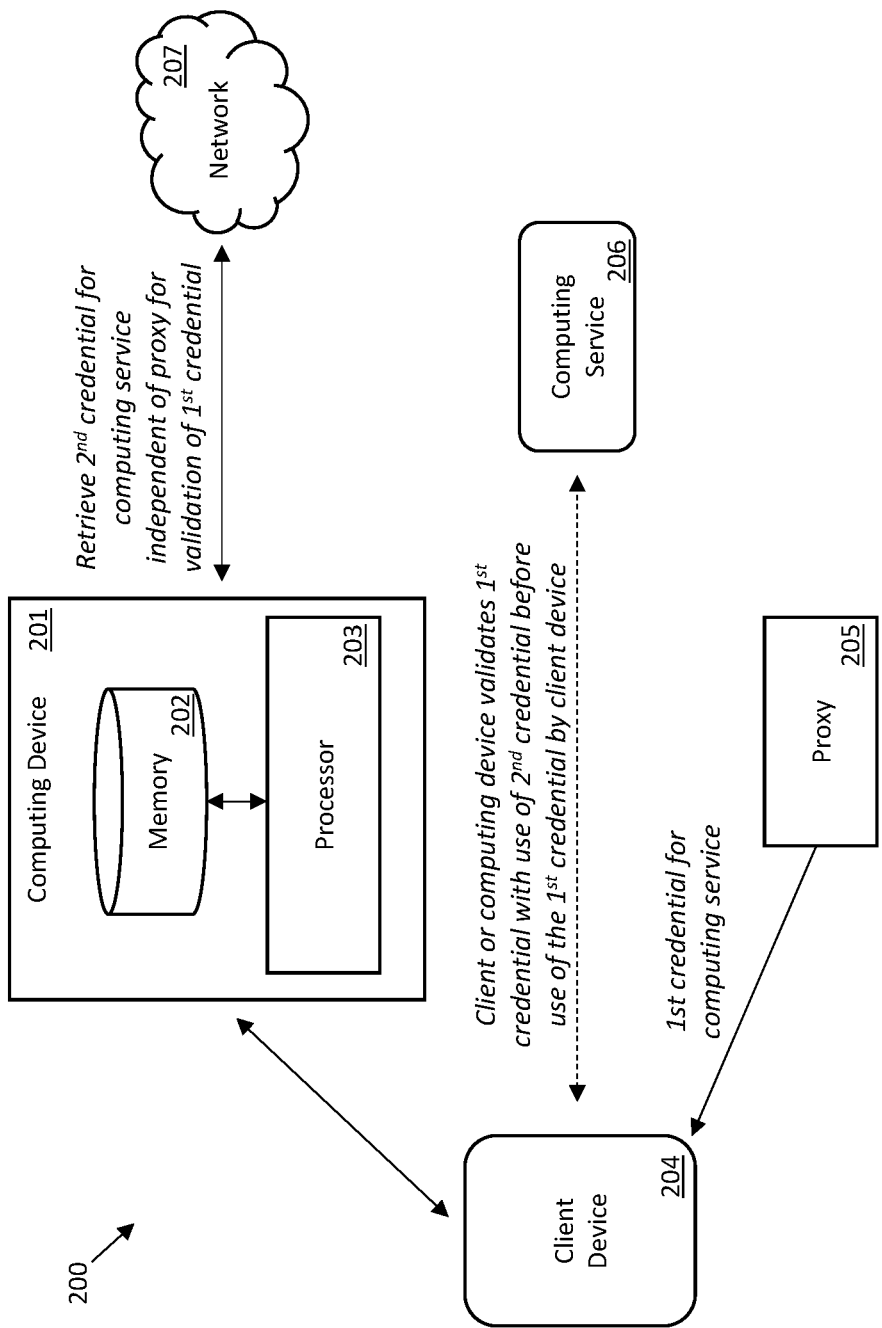
FIG. 4 is a schematic block diagram of a computing system providing independent validation of a credential in accordance with an example embodiment.

Turning to FIG. 4, a computing system 200 is now described which may be implemented using the computing devices and cloud infrastructure described above with reference to FIGS. 1-3, for example. A computing device 201 illustratively includes a memory 202 and a processor 203 configured to cooperate with the memory to establish a connection with a client device 204. In an example embodiment, the computing device 201 may be a server within a cloud-based validation service 208 (see FIG. 6), although a stand-alone device may be used in some embodiments.

In the illustrated example, the client device 204 has a first credential (e.g., something used to access a computing session or service) provided to it by a proxy 205 for connecting the client device to a computing service 206. As will be discussed further below, the first credential may include Secure Sockets Layer (SSL) certificates, Domain Name System (DNS) information, Public Key Infrastructure (PKI) certificates, Internet Protocol (IP) addresses, trusted root certificates, etc. By way of example, the proxy 205 may be present at a public network connection point (e.g., public wireless LAN hotspot), and the computing service 206 is a legitimate endpoint that the client device 204 wishes to access over the Internet (e.g., a Software as a Service (SaaS) app, an online shopping site, a social media service, etc.). In this scenario, there are multiple issues that can alter the way data is exchanged between the client device 204 and the computing service 206. In the case where the client device 204 connects to a wireless LAN hotspot and then tries to initiate a connection to the computing service 206, by making use of wireless LAN hotspot the client has to accept the terms and trust the certificates or profiles of the hotspot provider. This leaves the connections to and from the client device 204 vulnerable to interception and eavesdropping, as the client device is not connected to trusted home or workplace network but rather a network with unknown security setting. The may possibly result in the loss of sensitive information either via an MITM attack or by redirecting the client device to another malicious Web server, as noted above.

Before using the first credential provided by the proxy 205, the client device 204 sends a request to the computing device 201 via the connection to validate (e.g., by comparison to determine a match) the first credential. The computing device 201 retrieves a second credential for the computing service 206 independent of the proxy 205, which may be used by either the computing device 201 or the client device 204 to validate the first credential, and thereby provide the client with assurance that the first credential is not a fraudulent, fake or otherwise bogus credential intended to maliciously redirect the client to a location where sensitive information may be compromised. By "independent", it is meant that the computing service 206 does not have to go through the proxy 205 to obtain the information, but rather goes directly to DNS servers or other known legitimate sources for credentials on the Internet, for example.

While the client device 204 could itself request connection credentials for the computing service, since access is being provided through a public hotspot, etc., there still remains the possibility of an MITM attack. However, since the computing device 201 is a known, trust device (e.g., part of a trusted cloud service), having it independently verify the connection credential for the computing service 206 helps avoid the possibility of an MITM attack to ensure that the endpoint information provided by the proxy 205 is valid.

In an example embodiment, the client device 204 may pin the public key of the computing device 201 or cloud-based validation service 208 to establish a secure connection between the client device and this service. The cloud validation service 208 may collect public information available on the Internet for verification purposes, such as Secure Sockets Layer (SSL) certificates, Domain Name System (DNS) information, Public Key Infrastructure (PKI) certificates, Internet Protocol (IP) addresses, trusted root certificates, etc. For example, the cloud validation service 208 may use DNS information to make an SSL handshake to the computing service 206, and then from the SSL handshake it will retrieve the third party certificate and present that to the client device 204 (or compare this third party certificate with the first credential provided by the proxy to perform the verification itself in some embodiments).

Moreover, before returning the certificate to the client device 204, the computing device 201 may optionally perform additional validation of the third party certificate, such as to check for a trusted root certificate, verify certificate valid-from and valid-to times, etc. This additional validation is an extra measure of security that would not otherwise be available to the client device 204 if it were to validate the certificate itself. Another optional security measure which may be performed by the validation service is that it may share DNS check results and/or IP/MAC addresses, as well as other credentials or information for the computing service 206, and provide a risk-factor/indicator to the requesting client device 204.

In some embodiments, enterprises managing their respective endpoints can configure validation details with the validation service 208 to provide "deep validation" for computing services 206. That is, in some cases the enterprise could configure very specific and detailed information to the validation service for certain validation cases. This could allow the service to validate that a client device is talking to the correct endpoint via validating the IP address of that endpoint for the client, or some other very specific detail that only owners of the endpoint would know. This may help ensure that managed client devices 204 (e.g., client devices registered with an enterprise IT system) are communicating with the exact IP addresses and/or endpoints approved by the enterprise.

By way of example, the connection between the client device 204 and computing device 201 may be secured through the use of public key pinning. For example, the client device 204 may pin the public key of the validation service ahead of time, and it would therefore be able to establish a secure channel with the computing device 201 for leveraging the validation services. Cert-pinning or public key pinning is the process by which known good certificate info is "pinned" with prior knowledge. One approach to public key pinning includes embedding and pinning the public key of a service into the client application during the development process. Another approach involves pinning the public key at the first interaction between a client and service/host.

Figure 5:
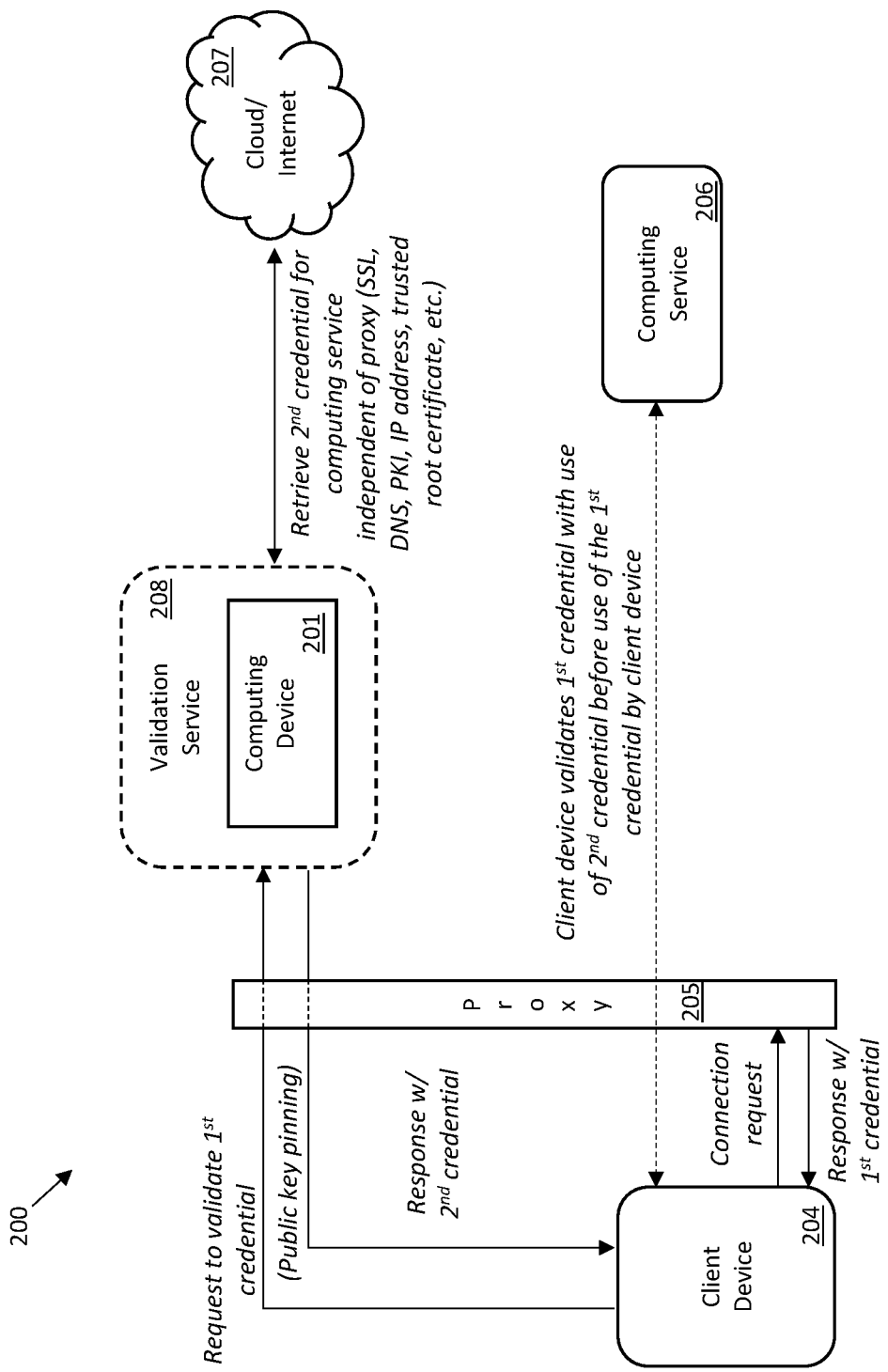
FIG. 5 is a schematic block diagram of an example implementation of the system of FIG. 4.

Referring additionally to FIG. 5, in one example implementation the client device 204 checks (e.g., dynamically checks) details of the computing service 206 to whom the client wants to connect by requesting information about the computing service (the second credential) from the computing device 201 of the validation service 208. The validation service 208 in turn gathers public information available for the computing service 206 (e.g., an SSL certificate, although other information such as IP address, etc., may also be used). In the illustrated example, this information is then passed back to the client device 204 for further processing, that is, for comparison with the information provided by the proxy 205 (e.g., the first credential) for connecting to the computing service 206. Based on the comparison, the client device 204 can either proceed with the connection to the computing service 206 when the credentials are validated (e.g., the first and second credentials match), or drop the connection with the proxy 205 if the credentials do not match or there is some other problem with the first credentials (e.g., it is past a valid-to date, etc.).

Figure 6:
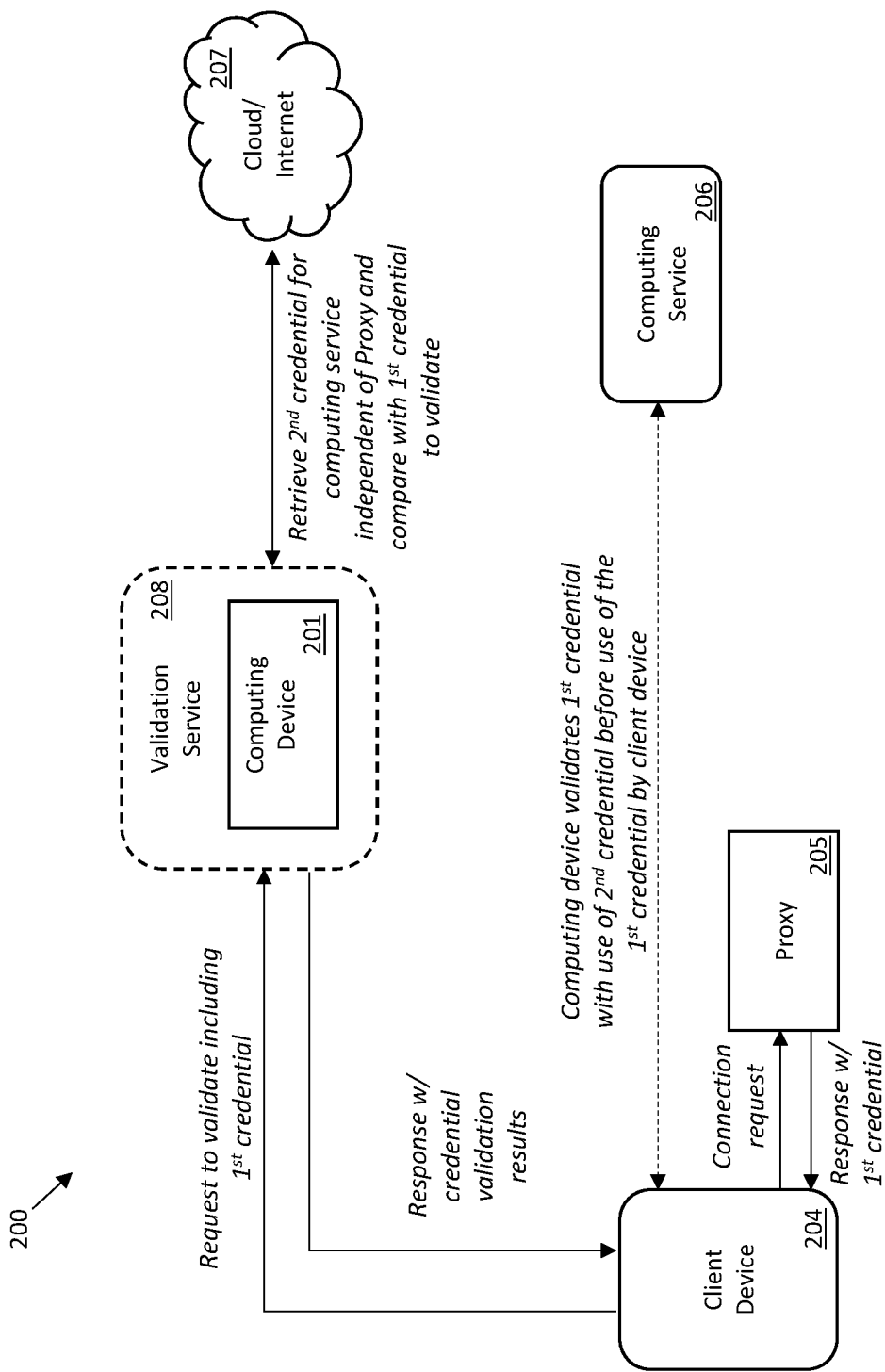
FIG. 6 is a schematic block diagram of another example implementation of the system of FIG. 4.

Referring now to FIG. 6, the client device 204 checks the details of the computing service 206 that the client wants to connect to by sending the first credential information as obtained by the proxy 205, and requests that the computing device 201 verifies this information about the computing service. The computing device 201 may then gather the public information available for the computing service 206 (e.g., SSL certificate, DNS information, PKI certification, IP/MAC address, trusted root certificate, etc.), although in some embodiments the computing device 201 could gather private information about the computing service 206. For example, this may be possible when the computing service 206 is registered with the validation service 208 beforehand, such that there is a trusted relationship between them. The information gathered by the validation service 208 (the second credential) is then processed and checked against the information shared by the client device 204 (the first credential), and a match or mismatch response is sent back to the client device 204 accordingly. Based on the response from the validation service 208, the client device 204 may either proceed with the connection to the computing service 206, or drop the connection, as noted above.

In some embodiments, the validation service 208 may further provide validation of other public information of third party computing services, such as DNS checks and IP/MAC address validations. Another type of validation may be to check for approved or blocked third parties/endpoints. Still further, the validation service 208 may also independently verify that endpoints are in an appropriate or expected geographic region, for example.

Figure 7:
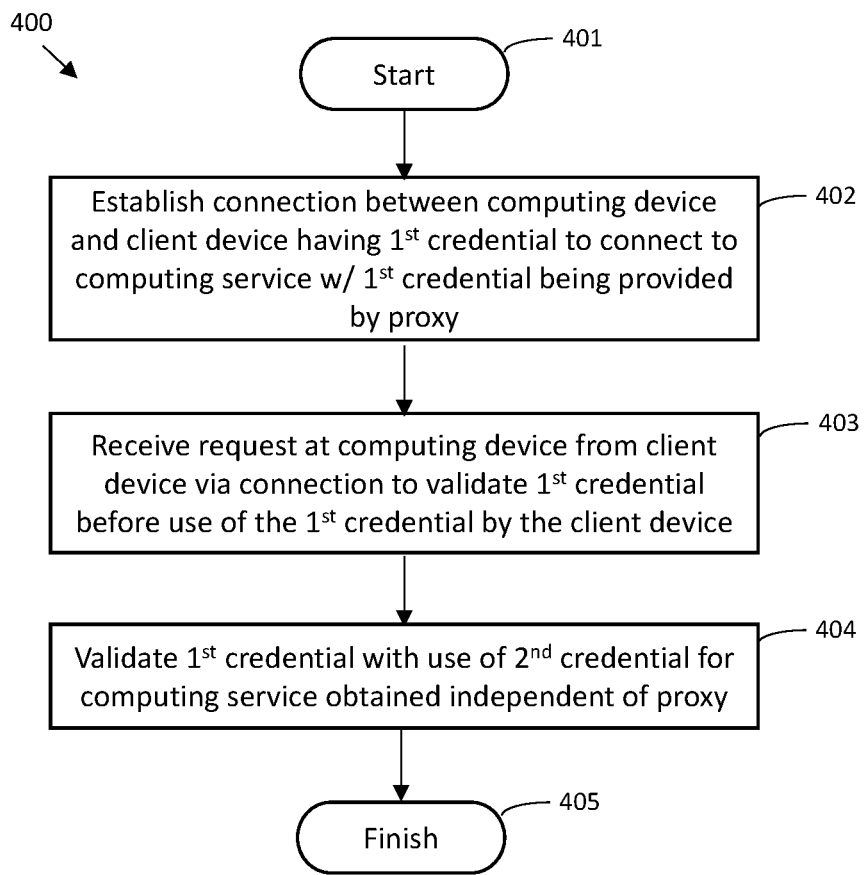
FIGS. 7 and 8 are flow diagrams illustrating example method aspects associated with the systems of FIGS. 4-6.

Turning now to FIG. 7 and flow diagram 400, related method aspects are first described. Beginning at Block 401, the method may include establishing a connection between a computing device 201 and a client device 204, with the client device having a first credential to connect the client device to a computing service 206 provided by a proxy 205 (Block 402), as discussed above. The method further illustratively includes receiving a request at the computing device 201 from the client device 204 via the connection to validate the first credential before use of the first credential by the client device, at Block 403, and validating at the computing device the first credential with use of a second credential for the computing service 206 obtained independent of the proxy 205 (Block 404), as also discussed above. The method of FIG. 7 illustratively concludes at Block 405.

Figure 8:
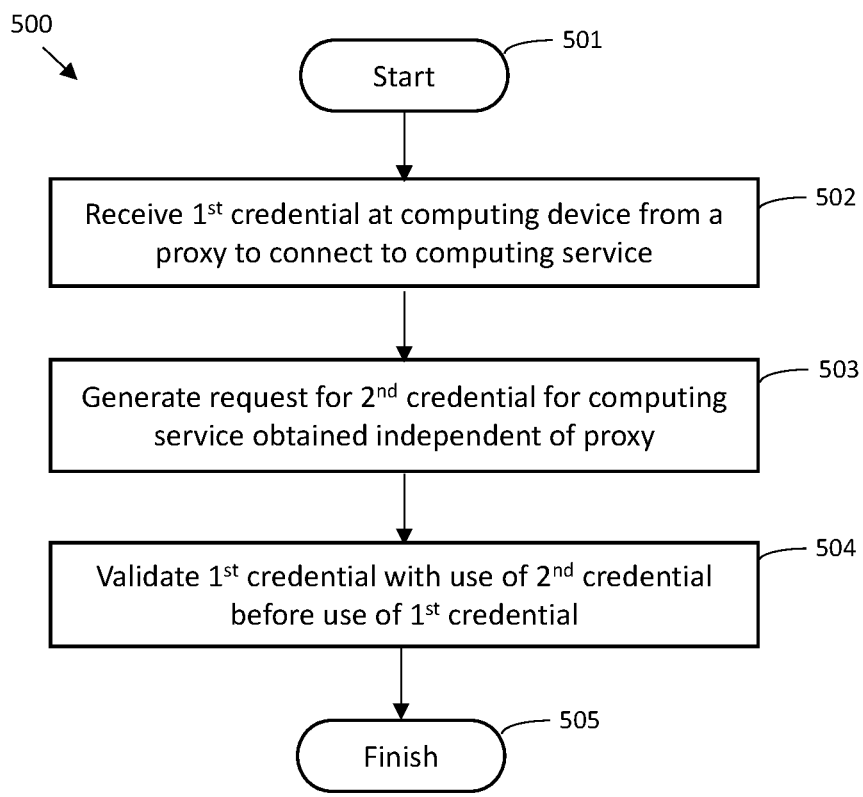

Referring additionally to FIG. 8 and flow diagram 500, beginning at Block 501, in an example embodiment the client device 204 may receive a first credential to connect the client device to the computing service 206 from the proxy 205 (Block 502), as discussed further above. The method further illustratively includes generating, at the client device 204, a request for a second credential for the computing service 206 obtained independent of the proxy 205 (e.g., by the validation service 208), at Block 503, and validating the first credential with use of the second credential at the client device before use of the first credential (Block 504), as also discussed further above. The method of FIG. 8 illustratively concludes at Block 505.

As will be appreciated by one of skill in the art upon reading the foregoing disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

The invention claimed is:

1. A computing device comprising:
   a memory and a processor configured to cooperate with the memory to:
   establish a connection with a client device using public key pinning, the client device having a first credential provided to it by a proxy for connecting the client device to a computing service,
   receive a request from the client device via the connection to validate the first credential before the client device uses the first credential to connect to the computing service via the proxy,
   responsive to the request from the client device, retrieve a second credential for the computing service from a verified credential source and without communicating through the proxy,
   compare the first credential and the second credential to verify that the first credential provided by the proxy is valid and the proxy is a legitimate source, connect the client device to the computing service via the proxy using the first credential responsive to validation of the first credential and the proxy, and terminate a connection with the proxy responsive to a failure to validate the first credential and the proxy.

2. The computing device of claim 1 wherein the second credential comprises a Secure Sockets Layer (SSL) certificate.

3. The computing device of claim 1 wherein the second credential comprises a Domain Name System (DNS) credential.

4. The computing device of claim 1 wherein the second credential comprises a Public Key Infrastructure (PKI) certificate.

5. The computing device of claim 1 wherein the second credential comprises an Internet Protocol (IP) address.

6. The computing device of claim 1 wherein the second credential comprises a trusted root certificate for the computing service.

7. A method comprising:
    establishing a connection between a computing device and a client device using public key pinning, the client device having a first credential provided to it by a proxy for connecting the client device to a computing service;
    receiving a request at the computing device from the client device via the connection to validate the first credential before the client device uses the first credential to connect to the computing service via the proxy;
    responsive to the request from the client device, retrieve a second credential for the computing service from a verified credential source and without communicating through the proxy;
    comparing, at the computing device, the first credential and the second credential to verify that the first credential provided by the proxy is valid and the proxy is a legitimate source;
    connecting the client device to the computing service via the proxy using the first credential responsive to validation of the first credential and the proxy; and
    terminating a connection with the proxy responsive to a failure to validate the first credential and the proxy.

8. The method of claim 7 wherein the second credential comprises a Secure Sockets Layer (SSL) certificate.

9. The method of claim 7 wherein the second credential comprises a Domain Name System (DNS) credential.

10. The method of claim 7 wherein the second credential comprises a Public Key Infrastructure (PKI) certificate.

11. The method of claim 7 wherein the second credential comprises an Internet Protocol (IP) address.

12. A computing device comprising:
    a memory and a processor configured to cooperate with the memory to:
        receive a first credential provided by a proxy for connecting the computing device to a computing service using public key pinning,
        generate a request for a second credential for the computing service, the second credential being obtained from a verified credential source and without communicating through the proxy,
        compare the first credential and the second credential before use of the first credential to verify that the first credential provided by the proxy is valid and the proxy is a legitimate source,
        connect the computing device to the computing service via the proxy using the first credential responsive to validation of the first credential and the proxy; and
        terminate a connection with the proxy responsive to a failure to validate the first credential and the proxy.

13. The computing device of claim 12 wherein the second credential comprises a Secure Sockets Layer (SSL) certificate.

14. The computing device of claim 12 wherein the second credential comprises a Domain Name System (DNS) credential.

15. The computing device of claim 12 wherein the second credential comprises a Public Key Infrastructure (PKI) certificate.

16. The computing device of claim 12 wherein the second credential comprises an Internet Protocol (IP) address.

17. A method comprising:
    receiving a first credential at a computing device provided by a proxy for connecting the computing device to a computing service using public key pinning,
    generating, at the computing device, a request for a second credential for the computing service, the second credential being obtained from a verified credential source and without communicating through the proxy,
    comparing the first credential and the second credential at the computing device before use of the first credential to verify that the first credential provided by the proxy is valid and the proxy is a legitimate source,
    connecting the computing device to the computing service via the proxy using the first credential responsive to validation of the first credential and the proxy; and
    terminating a connection with the proxy responsive to a failure to validate the first credential and the proxy.

18. The method of claim 17 wherein the second credential comprises a Secure Sockets Layer (SSL) certificate.

19. The method of claim 17 wherein the second credential comprises a Domain Name System (DNS) credential.

20. The method of claim 17 wherein the second credential comprises a Public Key Infrastructure (PKI) certificate.

21. The method of claim 17 wherein the second credential comprises an Internet Protocol (IP) address.

* * * * *